United States Patent
Deak et al.

(10) Patent No.: US 10,090,739 B2
(45) Date of Patent: Oct. 2, 2018

(54) ELECTRIC MACHINE HAVING A POTENTIAL EQUALIZATION DEVICE

(71) Applicant: Robert Bosch GmbH, Stuttgart (DE)

(72) Inventors: Istvan Deak, Ludwigsburg (DE); Bernd Schroeder, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 214 days.

(21) Appl. No.: 14/963,637

(22) Filed: Dec. 9, 2015

(65) Prior Publication Data

US 2016/0164380 A1    Jun. 9, 2016

(30) Foreign Application Priority Data

Dec. 9, 2014    (DE) .......................... 10 2014 225 236

(51) Int. Cl.
*H02K 13/00*    (2006.01)
*H02K 11/40*    (2016.01)

(52) U.S. Cl.
CPC ........... *H02K 11/40* (2016.01); *H02K 13/003* (2013.01)

(58) Field of Classification Search
CPC ...... H02K 11/40; H02K 11/00; H02K 13/003; H02K 13/00; H02K 13/02; H02K 13/06; H01R 13/6485; H01R 13/648; H01R 39/08; H01R 39/12; H01R 39/46; H01R 43/10
USPC .................. 310/71, 72, 67 R, 232, 231, 220
See application file for complete search history.

(56) References Cited

U.S. PATENT DOCUMENTS

| | | | |
|---|---|---|---|
| 4,492,999 A | 1/1985 | Amagasa | |
| 4,831,295 A | 5/1989 | Posedel | |
| 2008/0197744 A1* | 8/2008 | Herbold | H01R 43/10 310/71 |
| 2010/0117469 A1* | 5/2010 | Niederer | H02K 11/40 310/71 |
| 2013/0057096 A1 | 3/2013 | Okada et al. | |

FOREIGN PATENT DOCUMENTS

| | | | |
|---|---|---|---|
| CN | 201113686 | 9/2008 | |
| DE | 3511755 | 10/1985 | |
| DE | 10118004 | 11/2001 | |
| DE | 10324619 A1 * | 12/2004 | H01R 13/6485 |

OTHER PUBLICATIONS

Machine translation of DE 10324619 A1 (Dec. 2004).*

* cited by examiner

*Primary Examiner* — Michael Andrews
(74) *Attorney, Agent, or Firm* — Michael Best & Friedrich LLP

(57) ABSTRACT

An electric machine having a stator (3) and a rotor (4) mounted rotatably by means of a rotor shaft (5) and having a potential equalization device containing a resistor element for breaking down shaft voltages occurring at the rotor shaft (5), the resistor element contacting on the one hand a bus bar (24) of a slip ring module (20) and on the other hand the rotor shaft (5) at contact points, the resistor element being an electrical resistor (30; 46) provided with electrical connection elements (31, 32; 47, 48). At least one connection element (32; 47) of the electrical resistor (30; 46) is electrically conductively connected to the potential of the rotor shaft (5) via a pressure contact by a pressure element.

15 Claims, 9 Drawing Sheets

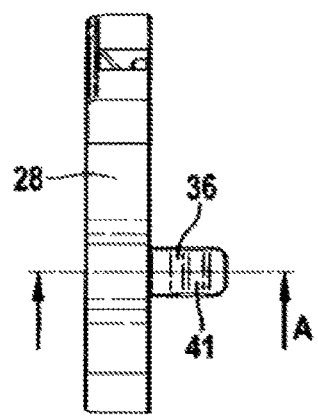
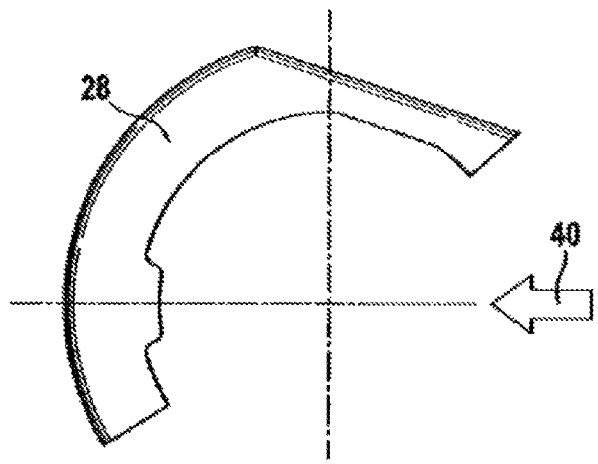
FIG. 9    FIG. 10
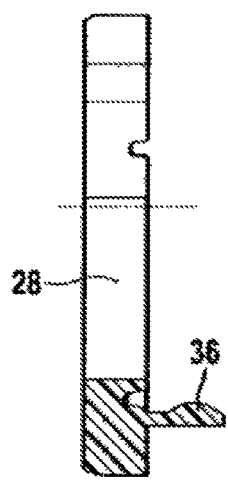
FIG. 11
(A-A)

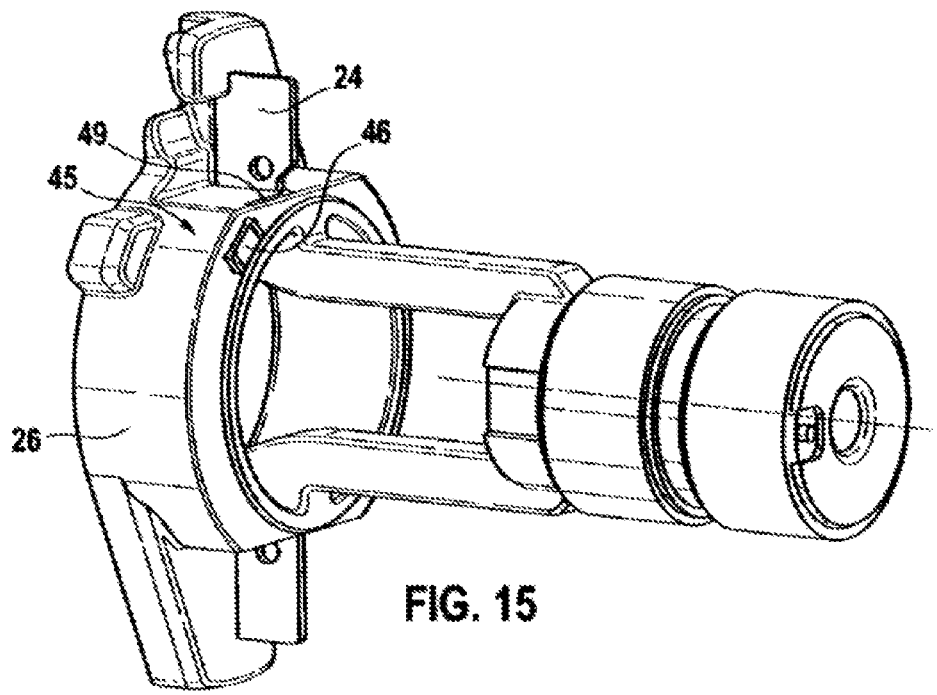
FIG. 15
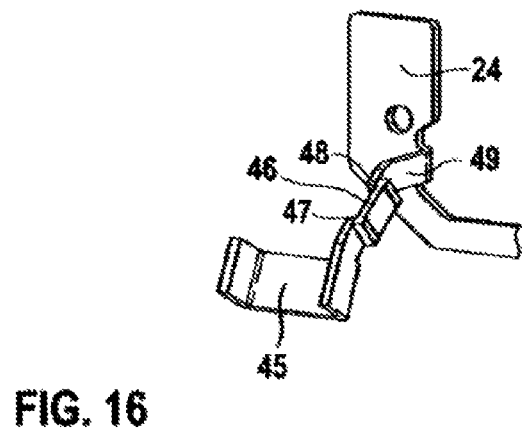
FIG. 16
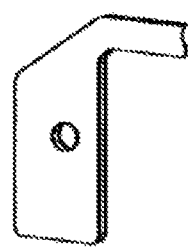

ELECTRIC MACHINE HAVING A POTENTIAL EQUALIZATION DEVICE

BACKGROUND OF THE INVENTION

The invention relates to an electric machine having a potential equalization device for breaking down shaft voltages, the electric machine having a stator and a rotor mounted rotatably by means of a rotor shaft and having a potential equalization device containing a resistor element for breaking down shaft voltages occurring at the rotor shaft, the resistor element contacting on the one hand a bus bar of a slip ring module and on the other hand the rotor shaft at contact points.

Electric machines are being used increasingly in motor vehicles as drive machines that also serve in overrun conditions as generators for energy recovery. Electric machines of this type are known by the name "boost-recuperation machines".

It is known that shaft voltages may form on the rotor shaft during operation in the case of electric machines and may constitute a voltage difference to the machine ground and may have different causes. One cause for this may be, for example, the clocked actuation of the stator or rotor winding by means of a pulse-width-modulated signal. In the case of this cause higher shaft voltages occur, the higher is the supply voltage of the on-board power system and therefore the operating voltage of the electric machine.

A further possible cause, however is also that electrostatic charges lead to high shaft voltages. By way of example, an electric machine operated as generator may be driven via a belt, and therefore the rotor may be electrically charged via the belt.

The occurring shaft voltages discharge in a pulse-like manner via a bearing, preferably via the drive-side ball bearing, and this therefore results in a pulse-shaped current flow through the bearing. Here, spark erosion may occur in the region of the bearing surfaces, which may lead to damage of the bearing. Spontaneous discharges of this type via a bearing of the rotor may occur in particular in the event of a failure of the insulation effect of the bearing grease in the form of a pulse-shaped current flow, whereby a permanent loading of the bearing damages said bearing and the service life of the bearing is considerably reduced.

Furthermore, the pulse-like discharge of the charge carriers located on the rotor shaft leads to the creation of electromagnetic waves, which negatively influence the electromagnetic compatibility of the product. In particular, this may hinder the fault-free function of electrical devices located in the vicinity.

An arrangement for dissipating shaft voltages for electric machines is known from DE 35 11 755 A1, in which charge carriers are diverted from the rotor shaft via a slip contact element. For this purpose a capacitor effective between the rotor shaft and machine ground is provided and may be connected in series with an inductor. The arrangement for dissipating shaft voltages may also be referred to as a potential equalization device, since a potential equalization is attained with this between ground or for example between the negative pole and the rotor shaft.

An alternating current generator is known from DE 101 18 004 A1, which comprises a stator and a rotor mounted rotatably by means of a rotor shaft. In this known electric machine an electrically conductive coating is applied to the rotor shaft and enables electrostatic charges from the rotor shaft and a slip rig of a slip ring group to drain away.

SUMMARY OF THE INVENTION

The electric machine according to the invention has the advantage that conventional discrete components can be used to break down shaft voltages or to dissipate charge carriers from the rotor shaft, said components being available in different embodiments very economically on the market. Depending on the application, an ohmic resistor having connection wires on both sides or a semiconductor element or an SMD resistor element can be used. The letters SMD stand here for "surface-mounted device". The used resistor element is electrically conductively connected in accordance with the invention to the potential of the rotor shaft via a pressure contact by means of a pressure element at least on one connection element of the resistor element. Here, an element that exerts a mechanical pressure in the region of an electrical contact, such that this electrical contact can be referred to as a pressure contact, is understood to be a pressure element. A pressure contact of this type, in conjunction with the used pressure element, constitutes a reliable electrical connection, which requires no soldering or welding at the contact point. The resistor element used can thus be attached in a simple manner in the region of the slip ring module of a rotor in order to break down shaft voltages.

It is particularly advantageous to form the pressure element integrally on a covering cap overlapping the resistor. The covering cap may be slid axially onto the rotor shaft and, overlapping the used resistor, fastened to a plastics body so that the resistor is protected at the same time against ambient influences and a reliable electrical contacting of the resistor to the rotor shaft is achieved. The plastics body, on which the covering cap is fitted, constitutes an overmolding of the rotor shaft in the region of the bus bars, which are provided as electrical line connections between the slip rings and the rotor winding.

The pressure element may protrude as a resilient tab on the covering cap and together therewith may form a one-piece plastics part. In principle, however, it is also possible for the pressure element to be attached to the covering cap as a separate part, for example when particular resilient properties are required for the pressure element.

The covering cap overlaps the rotor shaft annularly in a preferred embodiment and is placed on a plastics body, in which radially oriented connection lugs of the bus bars are inserted in part. The electrical resistor may be attached here to the end face of the plastics body between the contact points on the rotor shaft and a bus bar. The covering cap may be adhered to the plastics body or connected in another way in a form-fitting manner. With an embodiment of this type of the covering cap and the arrangement of the resistor, both the resistor and the covering cap can be mounted very easily and therefore also in a time-saving manner.

In accordance with a further very advantageous embodiment, the electrical resistor is fastened in the covering cap. The resistor may be clamped in or overmolded or may be fastened to the covering cap in a different way. Here, it is key that the connection wires or connection elements of the electrical resistor are exposed and that contact with the rotor shaft and with one of the bus bars is reliably produced when the covering cap is placed on the rotor. The reliable contact may be assisted here by pressure elements arranged in the covering cap.

The contact between rotor shaft and electrical resistor may also be provided very advantageously via a contact piece, which lies in a contact body surrounding the rotor shaft. The contact piece here has an electrical pressure contact to the rotor shaft, which may also be referred to as a press fit between the rotor shaft and contact piece. The electrical resistor is in this case electrically conductively connected via its connection elements, which are formed for example as connection wires, to the contact piece on the one hand and on the other hand to a bus bar of the slip ring module. The contacting of the rotor shaft via a contact piece of this type has the advantage that the contact points for the used resistor may be selected in terms of their position and also in terms of their shape such that not only can electrical resistors having connection wires be used without difficulty, but SMD resistor elements with their very small dimensions and small connection surfaces can be used.

If, in order to dissipate occurring shaft voltages, an ohmic resistor having connection wires on both sides is used as electrical resistor element, one of the connection wires can be bent to form a U-shaped loop, of which the free loop end bears with mechanical pressure exerted by a pressure element against a contact point on the rotor shaft. The free loop end is movable with little expenditure of force, such that a pressure element of accordingly simple design, for example a tab integrally formed on the covering cap, already provides the necessary force in order to produce reliable contact with the rotor shaft.

A particularly space-saving potential equalization device is possible with use of an SMD resistor.

BRIEF DESCRIPTION OF THE DRAWINGS

The invention will be explained hereinafter in greater detail on the basis of exemplary embodiments illustrated in the drawing.

In the drawing:

FIG. 9 shows a side view of a covering cap with tab, FIG. 10 shows an end-face plan view of the covering cap of FIG. 9, FIG. 11 shows a sectional view of the covering cap of FIG. 9 along the plane of section A-A, FIG. 15 shows the view of a slip ring module with an SMD resistor as resistor element, and FIG. 16 shows a detailed illustration of the slip ring module of FIG. 15 in the region of the contacting of the SMD resistor, but without plastics body.

DETAILED DESCRIPTION

Figure 1:
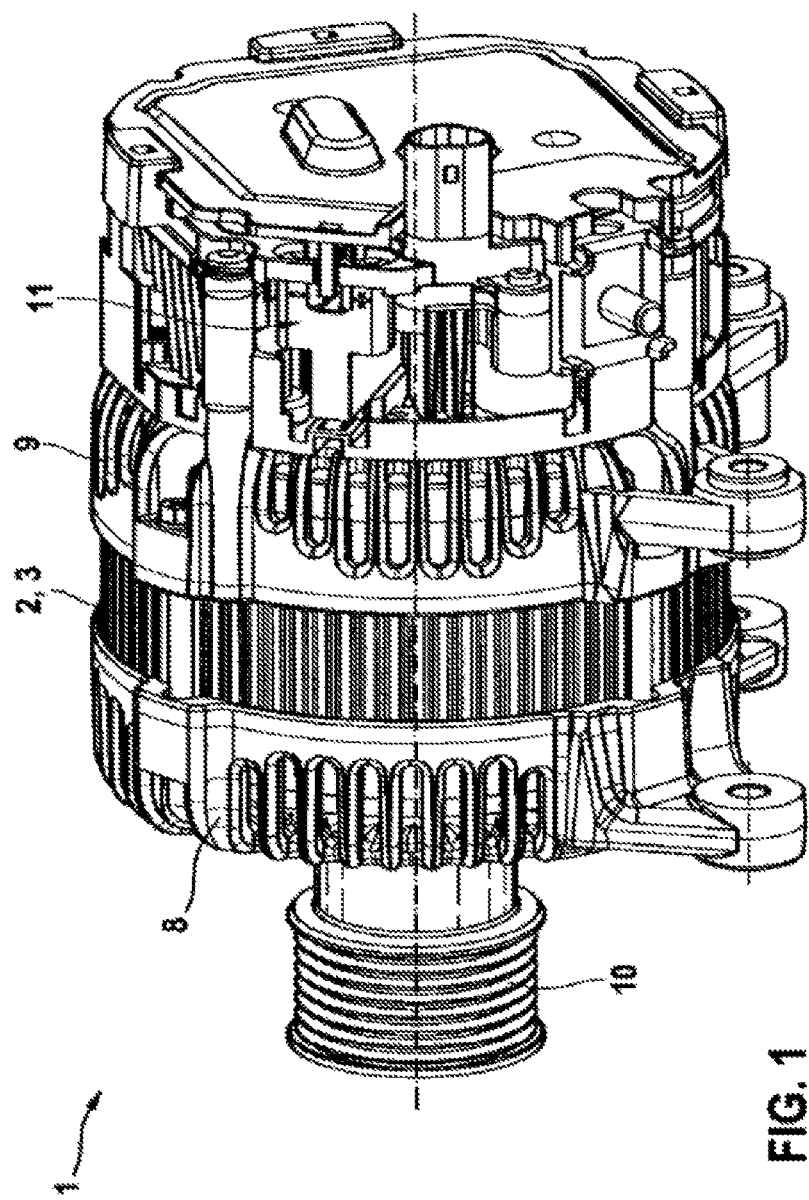
FIG. 1 shows an electric machine.
Figure 2:
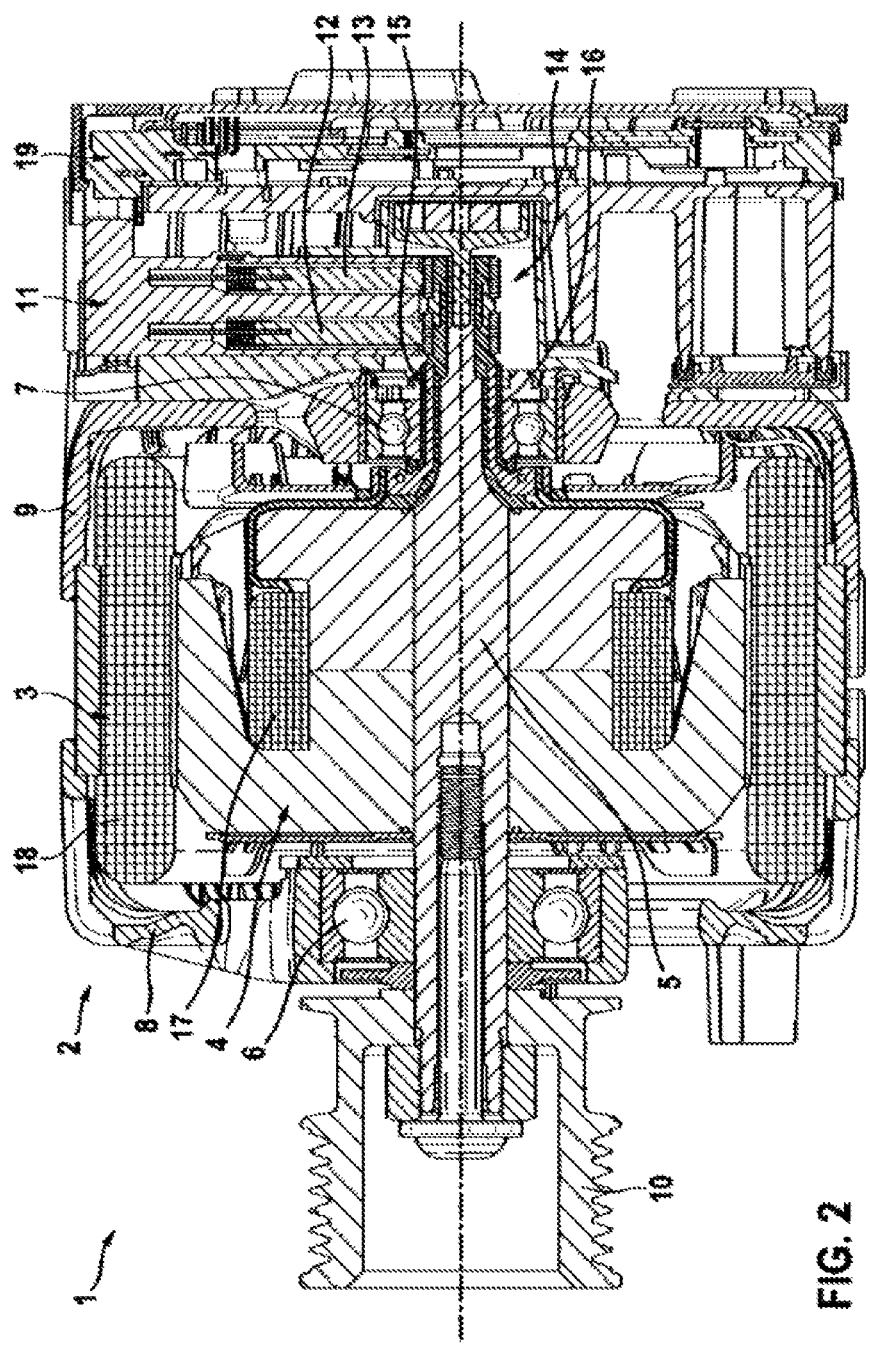
FIG. 2 shows a cross section of the electric machine illustrated in FIG. 1.

In FIGS. 1 and 2 a conventional electric machine 1 is illustrated and is used as a boost-recuperation system in motor vehicles. A stator 3 and a rotor 4 are arranged inserted in a stator housing 2. The rotor 4 is rotatably mounted in housing covers 8, 9 by means of a rotor shaft 5 and ball bearings 6, 7. A belt pulley 10 is fastened to the left end of the rotor shaft 5 in the drawing and serves to transfer torque from or to the electric machine 1.

Brushes 12, 13 are arranged in a brush holder 11 and are electrically conductively contacted with slip contact rings 14 of a slip ring module. The excitation winding 17 of the rotor 4 is energized via the slip rings 14 and bus bars 15, 16.

The individual phases of the stator winding 18 are actuated by a control device 19.

Figure 3:
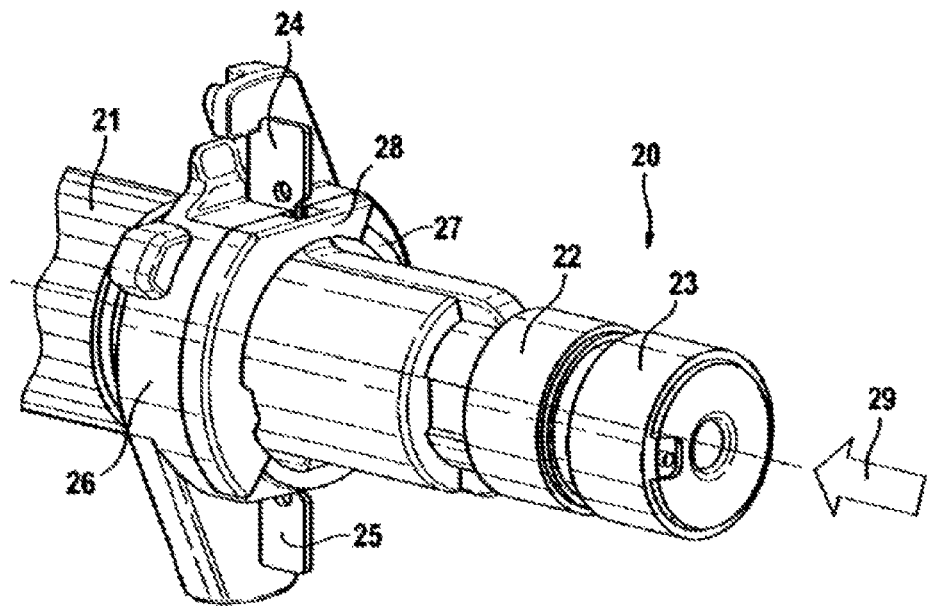
FIG. 3 shows a view of a rotor shaft with slip ring module with a covering cap covering an electrical resistor.

FIG. 3 now shows a perspective illustration of a slip ring module 20 with part of the rotor shaft 21. The slip ring module 20 consists fundamentally of slip rings 22, 23 and bus bars 24, 25, each of which is in contact with a respective one of the slip rings 22, 23. The bus bars 24, 25 are inserted in a plastics body 26, on the visible end face 27 of which a covering cap 28 formed as a ring segment is placed. The covering cap 28 is placed in the direction of the arrow 29.

Figure 4:
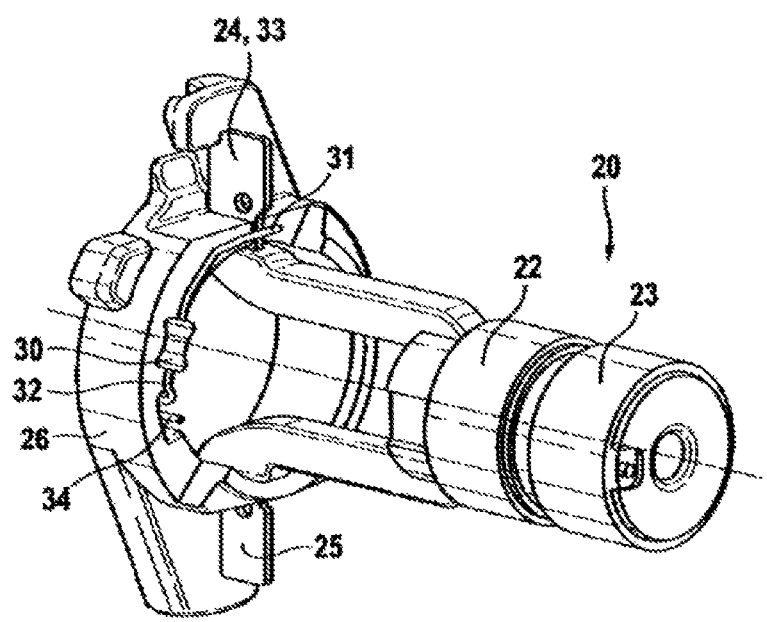
FIG. 4 shows a view of the slip ring module of FIG. 3, but without covering cap.

FIG. 4 shows the slip ring module 20 without the covering cap 28 of FIG. 3. Here, it can be seen that a resistor element in the form of an ohmic resistor 30 is arranged beneath the covering cap 28 and has connection wires 31, 32 as connection elements. The connection wire 31 bears electrically conductively against a radially oriented connection lug 33 of the bus bar 24, whereas the other connection wire 32 is bent in the region of its wire end 34 into a U-shaped loop. The resistance value of the resistor 30 may lie for example in a range between 50 ohm and 10 kohm depending on the application.

Figure 5:
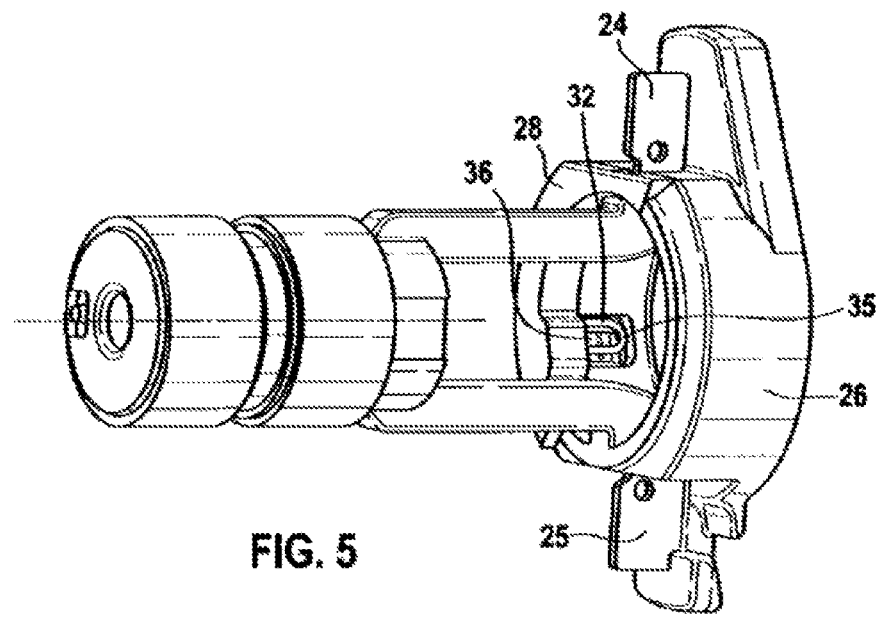
FIG. 5 shows a view of the slip ring module of FIG. 3, but from another perspective.
Figure 6:
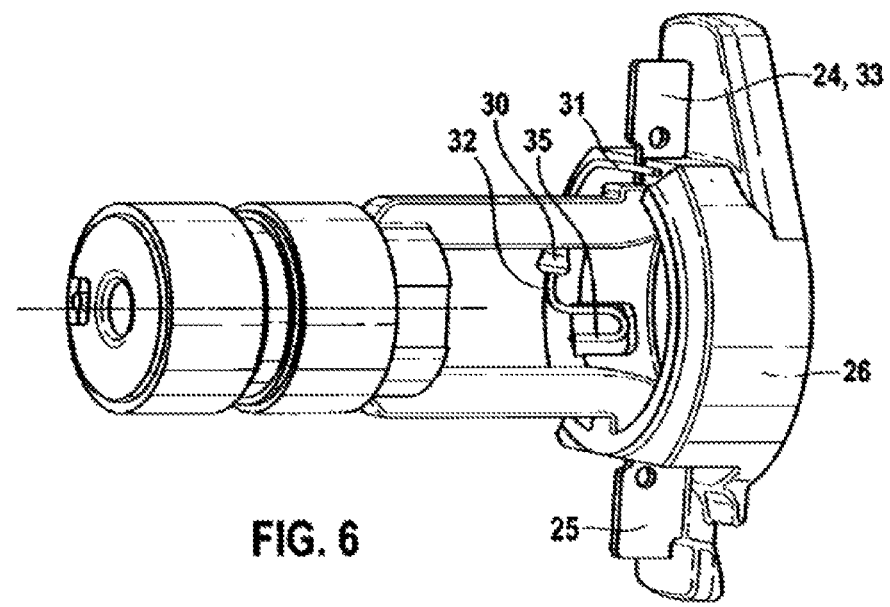
FIG. 6 shows a view of the slip ring module of FIG. 4, but from another perspective.

In FIGS. 5 and 6 the U-shaped loop 35 at the connection wire 32 of the resistor 30 can be clearly seen.

In FIG. 5 the resistor is covered by the covering cap 28, on which a resilient tab 36 protrudes as pressure element, which presses the free end of the connection wire 32 against the inwardly arranged rotor shaft (not illustrated here) in order to produce reliable electrical contact with the rotor shaft. The covering cap 28, substantially together with the electrical resistor 30, thus forms a potential equalization device, which avoids the occurrence of undesirable high shaft voltages.

Figure 7:
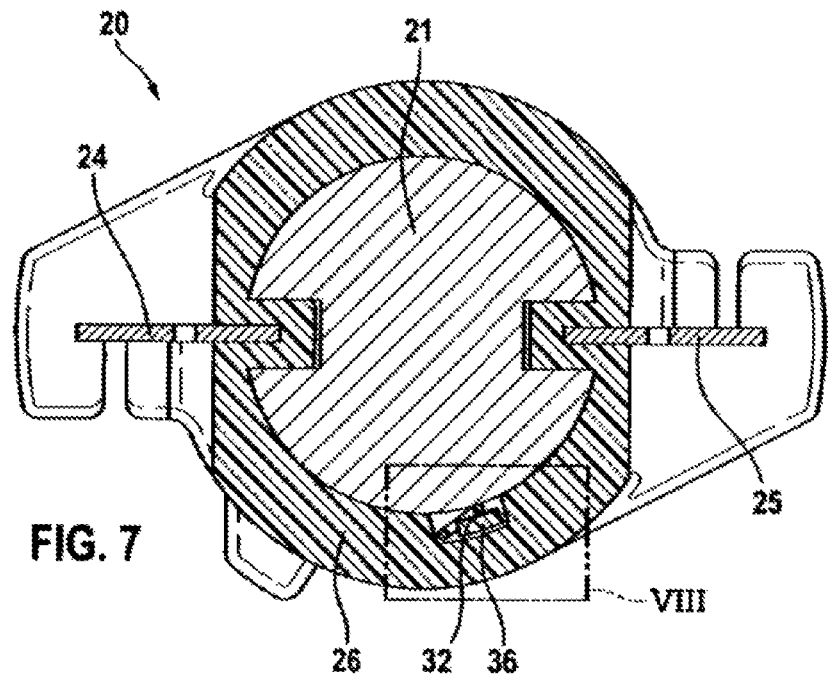
FIG. 7 shows a cross section through the slip ring module of FIG. 5 in the region of a pressure element.
Figure 8:
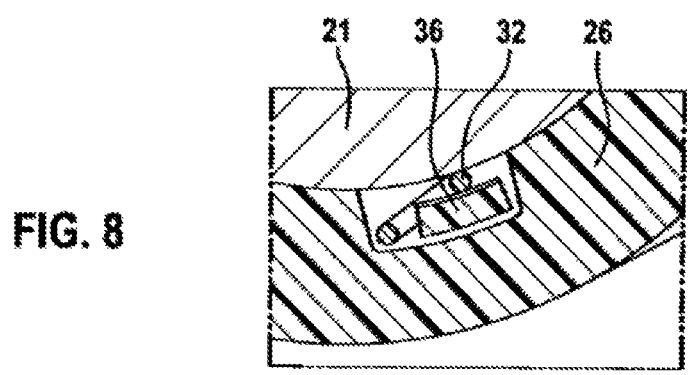
FIG. 8 shows an enlarged detailed view of FIG. 7.

In the sectional view of FIG. 7, which shows a cross section passing through the tab 36, it can be seen how the tab 36 presses the free end of the connection wire 32 bent in a U-shaped manner against the rotor shaft 21 surrounded by the plastics body 26. In the enlarged illustration of FIG. 8 the region in which the resilient tab 36 is located can be seen more clearly.

In FIGS. 9 to 11 the covering cap 28 of the previous figures is illustrated in different views. FIG. 9 shows the view of the covering cap 28 in accordance with the viewing direction illustrated by the arrow 40 in FIG. 10.

FIG. 10 shows the end face of the covering cap 28.

FIG. 11 shows the sectional view along the sectional plane A-A of FIG. 9.

The covering cap 28, together with the resilient tab 36, forms a one-piece injection-molded plastics part. A lip 41 is formed on the tab 36, with which lip the tab 36 is pressed resiliently against the connection wire 32 at the free end of the loop 35, as illustrated in the previous figures. The tab 36 thus forms a pressure element, which produces a reliable pressure contact between the connection wire 32 of the resistor 30 and the rotor shaft 21.

Figure 12:
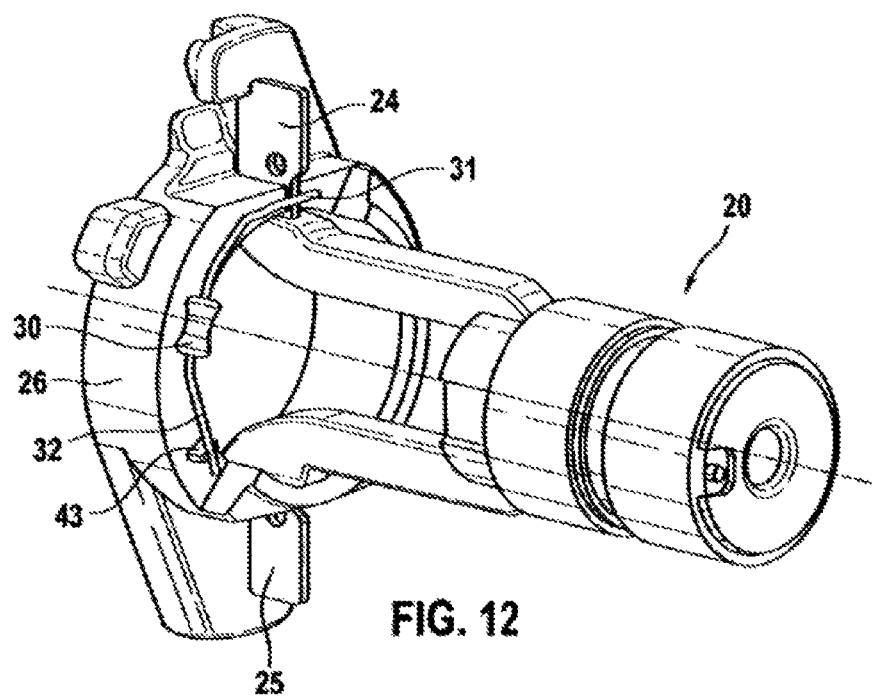
FIG. 12 shows a contacting of a resistor with the rotor shaft via a contact piece inserted in a plastics body.

In FIG. 12 a resistor 30 is provided in order to produce an ohmic connection between the rotor shaft and the bus bar 24, which resistor bears via a connection wire 31 against the bus bar 24 and is electrically conductively connected thereto. The other connection wire 32 bears against a contact piece 43 (visible here only in part), which is inserted in part in the plastics body 26. In order to cover the resistor 30 and in order to press the connection wires 31, 32 against the contact piece 43 and optionally also against the bus bar 24, a covering cap can be placed on the plastics body 26 over the resistor 30, as is illustrated in the case of the covering cap 28 of the previous figures. In principle, it is also possible however for the connection wires 31, 32 to be soldered at the contact points to the bus bar 24 and the connection piece 43 in order to produce a reliable electrical connection. The electrical contact from the resistor 30 to the rotor shaft running internally in the slip ring module 20 is provided via a pressure contact between the contact piece 43 and the rotor shaft. The contact piece 43 is visible in FIG. 13, since the plastic body 26 is not illustrated there.

Figure 14:
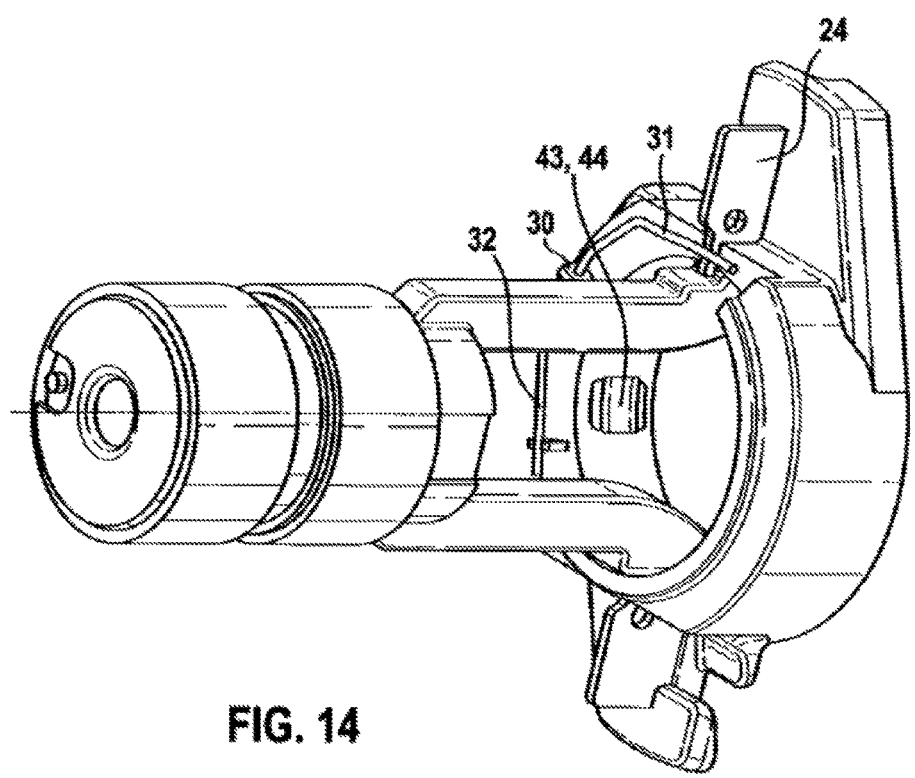
FIG. 14 shows a view of the embodiment of FIG. 12, but from an opposite viewing direction.

FIG. 14 shows a view that is modified compared with FIG. 12 and in which the contact surface 44 of the contact piece 43 pointing toward the rotor shaft (not illustrated here) is visible. The contact piece 43 is positioned in the plastics body 26 such that the contact surface 44 is pressed against the rotor shaft.

In the embodiment of FIG. 15 a contact piece 45 (not visible) is inserted in the plastics body 26 and is in contact with an SMD resistor element 46 arranged at the end face. In FIG. 16 the contact piece 45 and the SMD resistor element 46 can be seen more clearly, since here the plastics body 26 is not illustrated. The SMD resistor element 46 is electrically conductively connected via contact surfaces 47, 48 on the one hand to the contact piece 45 and on the other hand to a metal bracket 49 of the bus bar 24.

Figure 13:
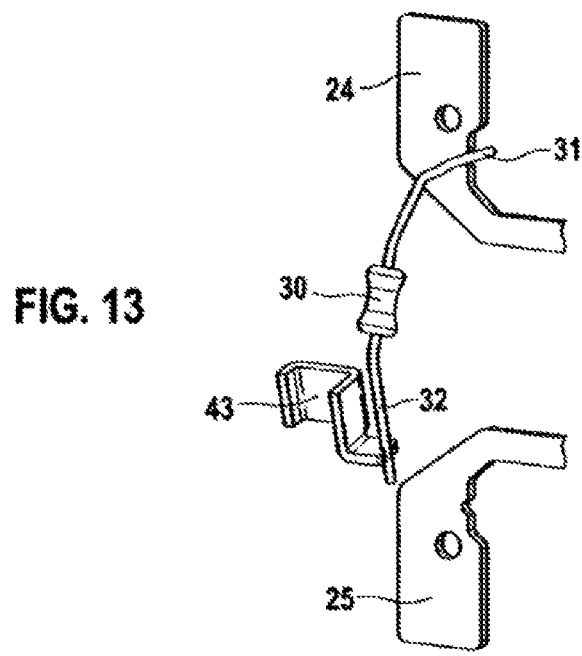
FIG. 13 shows an illustration of the embodiment of FIG. 12 in the region of the contact piece without plastics body.

With the embodiment according to FIG. 15 and FIG. 16 as well, the contact piece 45 is contacted with the rotor shaft via a pressure contact, as is the case in the embodiment according to FIGS. 12 to 14.

What is claimed is:

1. An electric machine having a stator (3) and a rotor (4) mounted rotatably by means of a rotor shaft (5) and having a potential equalization device containing a resistor element for breaking down shaft voltages occurring at the rotor shaft (5), the resistor element contacting a bus bar (24) of a slip ring module (20) at a contact point and contacting the rotor shaft (5) at another contact point, wherein the resistor element is an electrical resistor (30; 46) provided with electrical connection elements (31, 32; 47, 48), and wherein at least one of the connection elements (32; 47) of the electrical resistor (30; 46) is electrically conductively connected to the potential of the rotor shaft (5) via a pressure contact by a pressure element (36), wherein the pressure element is attached to a covering cap (28) overlapping the resistor (30), and wherein the pressure element is a resilient tab (36), which together with the covering cap (28) forms a one-piece plastics part.

2. The electric machine according to claim 1, wherein the covering cap (28) surrounds the rotor shaft (5) annularly at least in part and is placed onto a plastics body (26), in which at least one radially oriented connection lug (33) of a bus bar (24) is inserted in part.

3. The electric machine according to claim 2, wherein the electrical resistor (30) is fastened in the covering cap (28).

4. The electric machine according to claim 3, wherein the electrical resistor (30; 46) is an ohmic resistor (30), which on both sides has connection wires (31, 32) as connection elements.

5. The electric machine according to claim 4, wherein at least one of the connection wires (32) is bent into a U-shaped loop (35), of which a free loop end bears via a mechanical pressure exerted from a pressure element (36) against a contact point on the rotor shaft (5).

6. The electric machine according to claim 2, wherein the resilient tab (36) extends axially and projects between the plastics body (26) and the at least one of the connection elements (32) such that the one of the connecting elements (32) contacts the rotor shaft (5).

7. The electric machine according to claim 1, wherein the electrical resistor (30) is fastened in the covering cap (28).

8. The electric machine according to claim 1, wherein the electrical resistor (30; 46) is an ohmic resistor (30), which on both sides has connection wires (31, 32) as connection elements.

9. The electric machine according to claim 8, wherein at least one of the connection wires (32) is bent into a U-shaped loop (35), of which a free loop end bears via a mechanical pressure exerted from the pressure element (36) against the contact point on the rotor shaft (5).

10. The electric machine according to claim 1, wherein the electrical resistor is an SMD resistor element (46).

11. An electric machine having a stator (3) and a rotor (4) mounted rotatably by means of a rotor shaft (5) and having a potential equalization device containing a resistor element for breaking down shaft voltages occurring at the rotor shaft (5), the resistor element contacting a bus bar (24) of a slip ring module (20) at a contact point and contacting the rotor shaft (5) at another contact point, wherein the resistor element is an electrical resistor (30; 46) provided with electrical connection elements (31, 32; 47, 48), and wherein at least one of the connection elements (32; 47) of the electrical resistor (30; 46) is electrically conductively connected to the potential of the rotor shaft (5) via a contact piece (43; 45), and wherein the contact piece (43; 45) is partially embedded in a contact body (26) surrounding the rotor shaft (5) and protrudes from the contact body (26) such that the contact piece (43; 45) electrically conductively connects the potential of the rotor shaft (5) to the electrical resistor (30; 46) with pressure contact to the rotor shaft (5).

12. The electric machine according to claim 11, wherein the electrical resistor (30) is fastened in the covering cap (28).

13. The electric machine according to claim 11, wherein the electrical resistor (30; 46) is an ohmic resistor (30), which on both sides has connection wires (31, 32) as connection elements.

14. The electric machine according to claim 11, wherein the electrical resistor is an SMD resistor element (46).

15. The electric machine according to claim 11, wherein the contact piece (43; 45) is partially embedded in the contact body (26) and a contact surface (44) of the contact piece (43; 45) faces the rotor shaft (5) such that the contact surface (44) is pressed against the rotor shaft (5).

* * * * *